(12) United States Patent
Sgrignuoli

(10) Patent No.: US 6,812,427 B2
(45) Date of Patent: Nov. 2, 2004

(54) ROLLING HEAD FOR AN ELECTRIC RESISTANCE WELDER

(75) Inventor: Vittorio Sgrignuoli, Bologna (IT)

(73) Assignee: Pelliconi International Machinery S.p.A., Bologna (IT)

( * ) Notice: Subject to any disclaimer, the term of this patent is extended or adjusted under 35 U.S.C. 154(b) by 0 days.

(21) Appl. No.: 10/174,560

(22) Filed: Jun. 18, 2002

(65) Prior Publication Data

US 2002/0195430 A1 Dec. 26, 2002

(30) Foreign Application Priority Data

Jun. 20, 2001 (EP) .............................................. 01830410

(51) Int. Cl.[7] .............................................. B23K 11/06
(52) U.S. Cl. ......................................... 219/81; 219/81
(58) Field of Search .............................. 219/81, 82, 83, 219/84

(56) References Cited

U.S. PATENT DOCUMENTS

| | | | |
|---|---|---|---|
| 1,226,350 A | * 5/1917 | Mark et al. | 219/61.6 |
| 1,778,628 A | 10/1930 | Eckman | |
| 2,236,707 A | * 4/1941 | Darner et al. | 219/84 |
| 2,879,490 A | * 3/1959 | Campbell et al. | 439/28 |
| 3,234,495 A | 2/1966 | Martinez | |
| 3,588,434 A | * 6/1971 | Dashkevich | 219/74 |
| 3,609,278 A | 9/1971 | Cary | |
| 4,188,523 A | 2/1980 | Kawai et al. | |
| 5,159,168 A | * 10/1992 | Portmann et al. | 219/81 |

FOREIGN PATENT DOCUMENTS

| | | |
|---|---|---|
| EP | 0 459 091 A2 | 3/1991 |
| GB | 1069687 | 5/1967 |
| JP | 10029074 | 2/1998 |

OTHER PUBLICATIONS

European Search Report relating to European Application No. EP 01 83 0410.

* cited by examiner

Primary Examiner—M. Alexandra Elve
Assistant Examiner—Len Tran
(74) Attorney, Agent, or Firm—Fay, Sharpe, Fagan, Minnich & McKee, LLP

(57) ABSTRACT

A rolling head for a resistance seam welding machine comprises a stator; an annular electrode constituting the rotor rotatably mounted on the stator; a device for conducting electricity through a sliding contact, positioned between the stator and the rotor and pressed in axial direction against at least one of them by an elastic force; and conduits through which a coolant flows in the stator, in the rotor and in the sliding contact conductive device. The electrical conductive device comprises elastically yielding elements, forming a radial effect sector shaped and/or made in various different ways, positioned between the stator and the rotor and designed to remain permanently in contact with the stator and the rotor so as to conduct electrical current from one to the other.

14 Claims, 2 Drawing Sheets

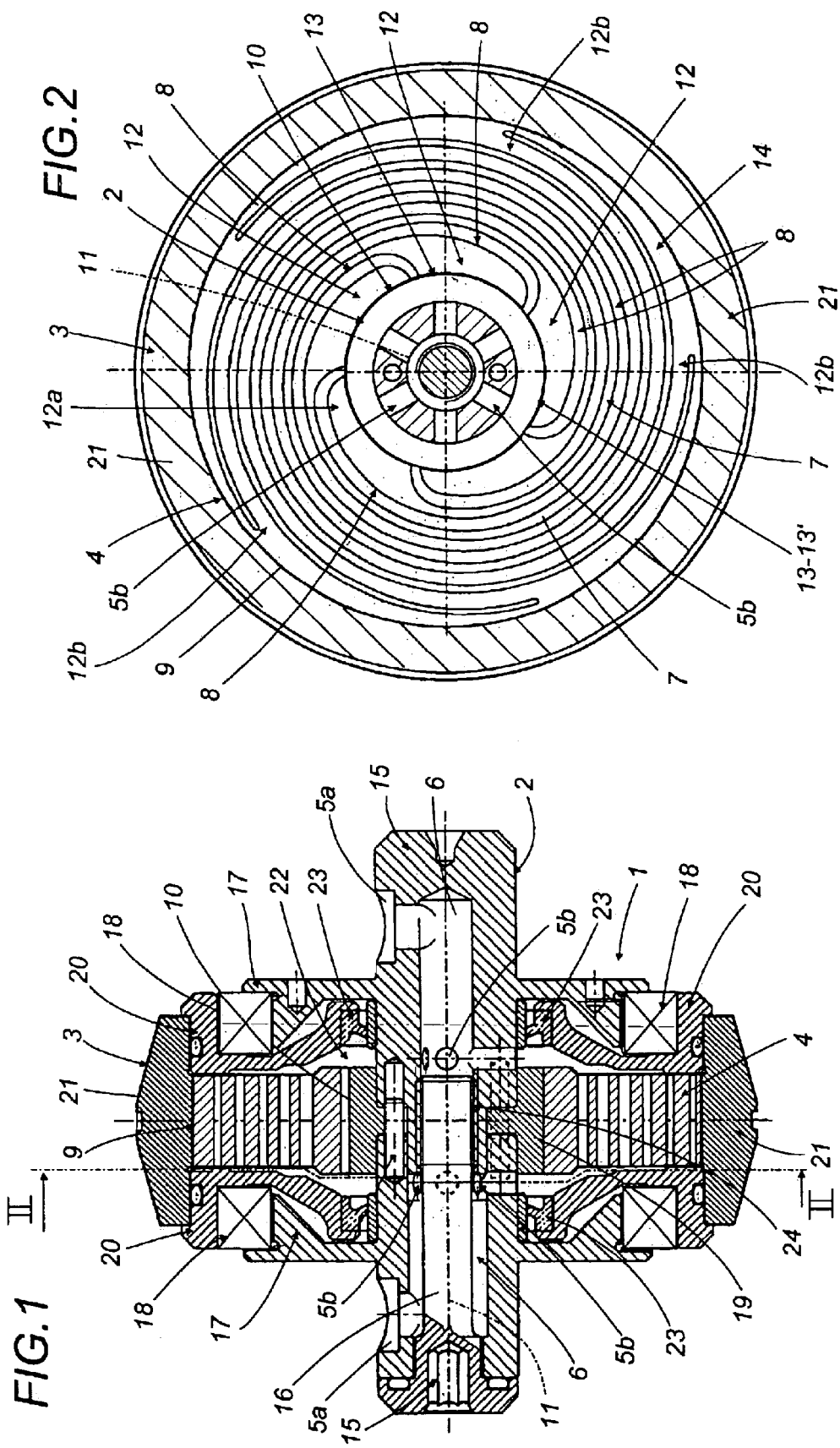

FIG.3
FIG.4
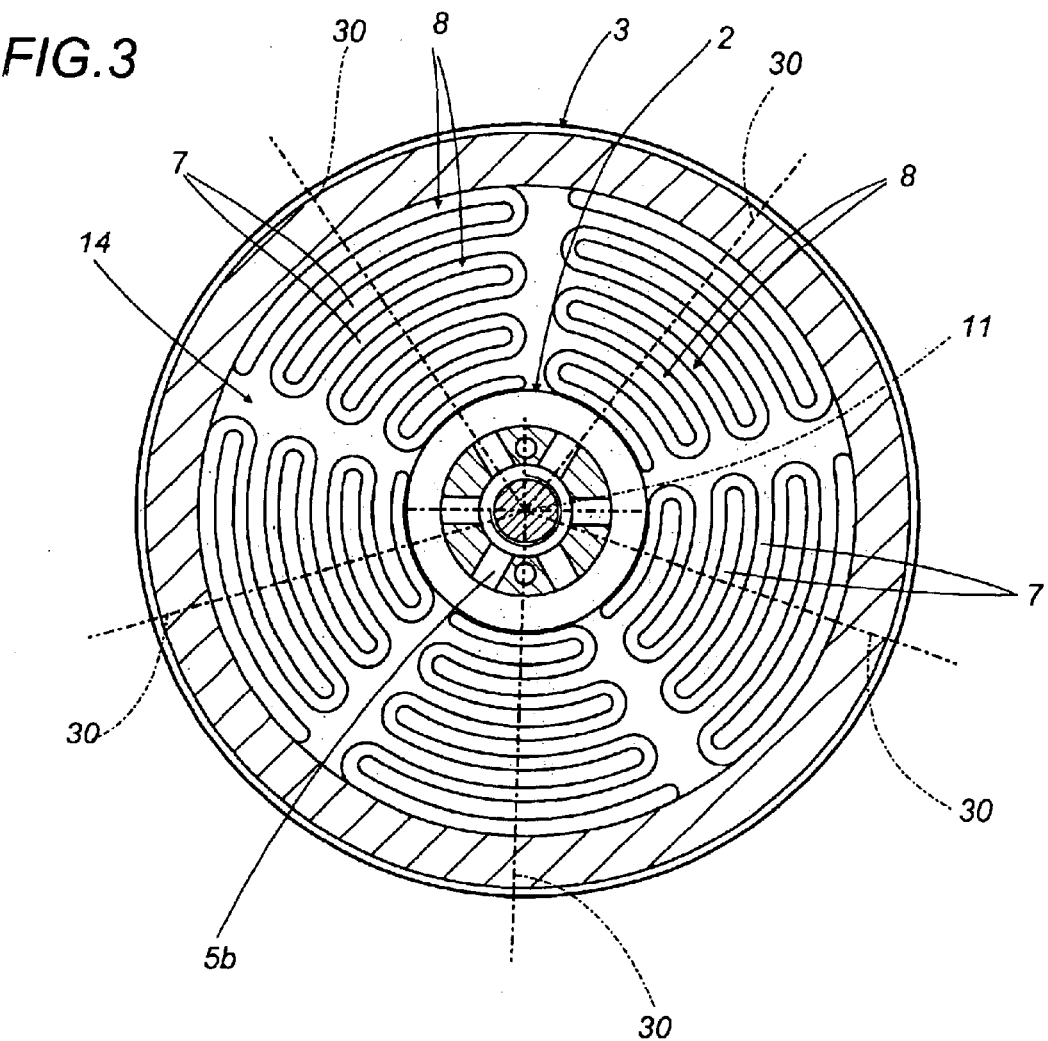
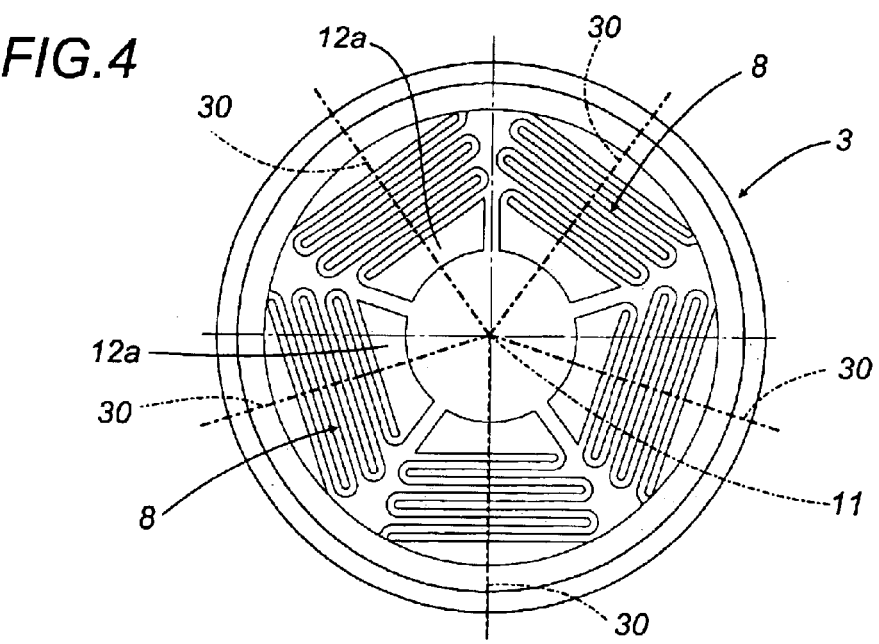

ROLLING HEAD FOR AN ELECTRIC RESISTANCE WELDER

BACKGROUND OF THE INVENTION

The present invention relates to the field of electrical resistance welding machines and concerns a rolling head for making seam welds on metal plates, especially thin metal plates which, starting from an initial flat state, are first curved in such a way that their two ends are brought edge to edge or slightly overlapped and then joined to form tubular elements or pipes used for a wide variety of different applications. The main application for such tubular elements is the manufacture of cans for foodstuffs.

A welding head of this type (especially one that constitutes the welding portion that is positioned inside the tubular element to be welded) essentially comprises two separate component parts. One of the components is a cylindrical shaft that is stationarily and rigidly mounted on a supporting arm and acts as a stator member of the assembly. The other is a ring-shaped component mounted coaxially on the stator member and rolls on the parts to be joined, thus acting as a rolling electrode (rotor member). When electrical current is passed through it, it works in conjunction with a matching, rotary welding disc located outside the tin can to make a seam weld.

The conduction of electrical current through the head between the fixed stator and the mobile rotor is accomplished by an electrical conductive device located between these two parts and electrically connected to them.

Electrical conductive devices of this kind used in the past (for example, see U.S. Pat. No. 4,188,523) used the conductive properties of a fluid in the liquid state: for example, mercury or eutectic mixes of other chemical substances.

In conductive devices of more recent design, electrical current is passed between the stator and the rotor through a mechanical, sliding contact.

A welding head of this type, disclosed in publication EP 0459 091 and made according to the preamble to independent claim herein, essentially comprises: a stator; an annular electrode constituting the rotor, rotatably mounted on the stator and coaxial therewith; a device for conducting electricity through a sliding contact, positioned between the stator and the rotor and pressed in axial direction against at least one of them by an elastic force; and conduits through which a coolant flows in the stator, in the rotor and in the sliding contact conductive device.

Heads of this kind have proved fully satisfactory for practical purposes. However, they are still subject to considerable improvements forming the subject-matter of the present invention.

Accordingly, the invention has for a first object to provide a welding head which allows higher currents to be exchanged between stator and rotor than prior art welding heads without increasing the size of the welding head compared to prior art heads of the same kind.

A further object of the invention is to more effectively dissipate heat, which, combined with the higher welding current, increases both the welding performance and the useful life of the welding head according to the invention, with obvious economic advantages.

Another object of the invention is to provide a welding head where the electrical current passes between stator and rotor without breaks, even at high production speeds and in the presence of strong vibrations and/or local irregularities in the materials to be welded.

Yet another object of the invention is to provide a welding head of simpler construction than prior art heads and that is quicker and easier to assemble and maintain.

SUMMARY OF THE INVENTION

According to the invention, these and other objects are achieved by a rolling head for a resistance seam welding machine comprising: a stator; an annular electrode constituting the rotor, rotatably mounted on the stator and coaxial therewith; a device for conducting electricity through a sliding contact, positioned between the stator and the rotor and pressed in axial direction against at least one of them by an elastic force; and conduits through which a coolant flows in the stator, in the rotor and in the sliding contact conductive device; wherein the sliding contact conductive device comprises at least one elastically yielding element forming a radial sector, positioned between the stator and the rotor and designed to remain permanently in contact with the stator and rotor so as to conduct electrical current from one to the other.

BRIEF DESCRIPTION OF THE DRAWINGS

The technical characteristics of the invention, in accordance with the above mentioned aims, are set out in the claims herein and the advantages more clearly illustrated in the detailed description which follows, with reference to the accompanying drawings, which illustrate preferred embodiments of the invention without limiting the scope of the inventive concept and in which:

FIG. 1 is an axial cross section of a welding head according to the invention;

FIG. 2 is a cross section through line II—II in FIG. 1;

FIGS. 3 and 4 are schematic representations of different embodiments of the invention.

DESCRIPTION OF THE PREFERRED EMBODIMENTS

With reference to the accompanying drawings, the numeral 1 denotes in its entirety a rolling head for a resistance welding machine used in particular for the seam welding of tubular elements or pipes made by bending a thin metal plate, originally flat, into a cylindrical shape, placing two ends edge to edge or overlapping them and joining them.

The head 1 essentially comprises: a stator, labeled 2 as a whole; a rotor, labeled 3 as a whole; an electrical conductive device 4 positioned between the stator and the rotor; and a system of conduits 5a, 5b, 6, 7 to allow coolant to flow through the head 1.

The stator 2 is embodied by a straight shaft consisting of two separate, hollow component parts 15 which are coaxial with each other. The component parts 15 continue straight on from each other, being rigidly but removably connected to each other by a threaded connection 24 comprising a bolt 16 housed in axial position.

Each of the two component parts 15 has a first flange 17, in the form of a radial disk, made in a single piece with the component part 15.

At its center line, at the joint between the two component parts 15 of the shaft, the stator 2 is equipped with an annular collar 19. The collar, which is made of electrical conductive material, is attached to the shaft by the axial force exerted by the component parts 15 against each other when the bolt 16 is tightened.

The rotor 3 comprises an electrode having the shape of a ring 21, keyed to a pair of second, parallel flanges 20, supported through rolling bearings 18 by the first flanges 17 of the component parts 15 of the shaft: the ring 21 is therefore coaxial with and rotatable on the stator 2.

The shaft of the stator 2, the second flanges 20 and the ring 21 together delimit—within the head 1—a watertight chamber 22, sealed by lip seals 23 positioned between the stator 2 shaft and the second flanges 20 of the rotor 3. The watertight chamber 22 communicates with the outside of the head 1 through the aforementioned conduits, some of which 5a, 5b are radial and others 6 are axial, and which run through the two component parts 15 of the stator 2 shaft.

The sliding contact electrical conductive device 4 is positioned between coaxial, cylindrical, facing surfaces 9, 10 of the stator 2 and of the rotor 3 and essentially comprises [FIG. 2] a number of elastically yielding elements 8, preferably having the shape of a spiral arc, distributed around a common axis 11 and forming one or more flexible sectors that conduct electricity between the stator 2 and the rotor 3 of the head 1.

The elastically yielding elements 8 are separated from each other lengthways. Their free ends 12a are placed in sliding contact with the outside surface 10 of the stator 2; while the opposite ends 12b are collectively joined to a single, peripheral, tubular element 14 which is preferably integral with the rotor 3 itself.

The elastically yielding elements 8 are mounted on and project from the tubular element 14 and are much thicker at their free ends 12a than they are in their middle portions. Further, the free ends 12a of the elements 8 of the rotor 3 are shaped in such a way as to present a cylindrical surface portion 13 designed to come into contact with a matching cylindrical portion 13' of the opposing surface of the stator 2.

Thanks to the elasticity of the material of which the elastically yielding elements 8 are made (preferably a special copper alloy), their spiral shape and their extended length between the ends 12a, 12b, the elastically yielding elements 8 are extremely flexible and their free ends 12a are in constant elastic contact with the stator 2.

The result is a particularly advantageous type of contact. Indeed, the high flexibility of the elastically yielding elements 8 provides a contact which, in terms of stability of electrical conduction, is extremely stable although it requires very little pressing force. Moreover, since the pressing force is distributed on relatively wide sliding surfaces, the wear on the sliding surfaces due to the specific pressure produced by the pressing force is also very low, and that means that the useful life of the conductive device 4 is extended accordingly.

The contact enables current to be conducted continuously to the mobile rotor 3, even in the presence of mechanical vibrations or deformations of the head 1 due to external causes such as, for example, instantaneous variations in the working loads and/or irregularities in the materials to be welded.

Furthermore—as clearly illustrated in FIG. 2—there are through conduits 7 running between adjacent elastically yielding elements 8 and each delimited by a pair of lateral surfaces of the elastically yielding elements 8.

The coolant passing through the watertight chamber 22 flows through the conduits 7 in a direction parallel to the axis of rotation 11 of the rotor 3. The large surface area of the elastically yielding elements which comes into contact with the coolant produces very intensive heat exchange, which efficaciously cools the head 1.

The yielding elements 8 described above constitute a first embodiment of radial effect elastic sectors—that also follow a winding path around the axis 11 to form a shape essentially like that of a circular arc or spiral arc—designed to conduct current between the stator 2 and the rotor 3. This must, however, be considered as a preferred embodiment that does not restrict the inventive concept. In fact, the sectors may have several different shapes without departing from the scope of the invention. Thus, looking at FIG. 3, it can easily be inferred that conduction of current between the stator 2 and the rotor 3 might be accomplished equally well by elastic sectors whose yielding elements 8 have the shape of a sinusoid (in this case with arched branches), extending along a radial line 30 and/or a line that may follow a winding path from the center to the periphery of the head 1 and at the same time also around the axis 11. FIG. 4 illustrates a side view of another embodiment, where the yielding elements 8 of the rotor are again in the shape of a sinusoid but with the branches parallel to each other. In this embodiment, the large size of the free end 12a that is in contact with the stator provides good contact with the stator while at the same guaranteeing a long rotor life.

As to the methods for manufacturing the yielding elements 8, forming them en bloc by electron discharge machining from a single tubular element 14 is particularly advantageous and, therefore, preferable. Moreover, the tubular element 14 may be an integral part either of the rotor 3 or of the stator 2.

The invention described can be used for obvious industrial applications. It can be subject to numerous modifications and variations without thereby departing from the scope of the inventive concept. Moreover, all the details of the invention may be substituted by technically equivalent elements.

What is claimed:

1. A rolling head for a resistance seam welding machine comprising: a stator; an annular electrode constituting the rotor rotatably mounted on the stator and coaxial therewith for rotation about an axis; a device for conducting electricity through a sliding contact, positioned between the stator and the rotor and pressed against at least one of them by an elastic force; and conduits through which a coolant flows in the stator, in the rotor and in the sliding contact conductive device; wherein the sliding contact conductive device comprises at least one elastically yielding element forming a radial sector, positioned between the stator and the rotor and designed to remain permanently in contact with the stator and the rotor so as to conduct electrical current from one to the other, wherein the elastically yielding element extends from an end that is connected to one of said stator and rotor to a free end that slidably contacts the other of said stator and rotor under resilient biasing force generated by said elastically yielding element due to its elasticity and its extension along a path that winds around said axis, and wherein the elastically yielding element is shaped like at least one spiral arc.

2. The head according to claim 1, wherein the at least one elastically yielding element comprises a number of elastically yielding elements that are made from a single tubular element.

3. The head according to claim 2, wherein the elastically yielding elements are made by electron discharge machining of the single tubular element.

4. A rolling head for a resistance seam welding machine comprising:
   a stator;
   an annular electrode constituting the rotor rotatably mounted on the stator and coaxial therewith;
   a device for conducting electricity through a sliding contact, positioned between the stator and the rotor and pressed against at least one of them by an elastic force; and, conduits through which a coolant flows in the stator, in the rotor and in the sliding contact conductive device, wherein the sliding contact conductive device comprises:

at least one elastically yielding element forming a radial sector, positioned between the stator and the rotor and designed to remain permanently in contact with the stator and the rotor so as to conduct electrical current from one to the other, wherein the elastically yielding element is shaped like at least one sinusoidal arc extending at least along a radial direction of the head.

5. A rolling head for a resistance seam welding machine comprising: a stator; an annular electrode constituting the rotor rotatably mounted on the stator and coaxial therewith for rotation about an axis; a device for conducting electricity through a sliding contact, positioned between the stator and the rotor and pressed against at least one of them by an elastic force; and conduits through which a coolant flows in the stator, in the rotor and in the sliding contact conductive device; wherein the sliding contact conductive device comprises at least one elastically yielding element forming a radial sector, positioned between the stator and the rotor and designed to remain permanently in contact with the stator and the rotor so as to conduct electrical current from one to the other, wherein the elastically yielding element extends from an end that is connected to one of said stator and rotor to a free end that slidably contacts the other of said stator and rotor under resilient biasing force generated by said elastically yielding element due to its elasticity and its extension along a path that winds around said axis, and wherein the elastically yielding element is positioned between coaxial, facing surfaces of the rotor and of the stator.

6. A rolling head for a resistance seam welding machine comprising:

a stator;

an annular electrode constituting the rotor rotatably mounted on the stator and coaxial therewith;

a device for conducting electricity through a sliding contact, positioned between the stator and the rotor and pressed against at least one of them by an elastic force; and, conduits through which a coolant flows in the stator, in the rotor and in the sliding contact conductive device, wherein the sliding contact conductive device comprises:

at least one elastically yielding element forming a radial sector, positioned between the stator and the rotor and designed to remain permanently in contact with the stator and the rotor so as to conduct electrical current from one to the other, wherein the elastically yielding element varies in thickness along its longitudinal extension.

7. A rolling head for a resistance seam welding machine comprising: a stator; an annular electrode constituting the rotor rotatably mounted on the stator and coaxial therewith for rotation about an axis; a device for conducting electricity through a sliding contact, positioned between the stator and the rotor and pressed against at least one of them by an elastic force; and conduits through which a coolant flows in the stator, in the rotor and in the sliding contact conductive device; wherein the sliding contact conductive device comprises at least one elastically yielding element forming a radial sector, positioned between the stator and the rotor and designed to remain permanently in contact with the stator and the rotor so as to conduct electrical current from one to the other, wherein the elastically yielding element extends from an end that is connected to one of said stator and rotor to a free end that slidably contacts the other of said stator and rotor under resilient biasing force generated by said elastically yielding element due to its elasticity and its extension along a path that winds around said axis, and wherein the elastically yielding element is integral with the rotor and is in contact with the outer surface of the stator.

8. A rolling head for a resistance seam welding machine comprising: a stator; an annular electrode constituting the rotor rotatably mounted on the stator and coaxial therewith for rotation about an axis; a device for conducting electricity through a sliding contact, positioned between the stator and the rotor and pressed against at least one of them by an elastic force; and conduits through which a coolant flows in the stator, in the rotor and in the sliding contact conductive device; wherein the sliding contact conductive device comprises at least one elastically yielding element forming a radial sector, positioned between the stator and the rotor and designed to remain permanently in contact with the stator and the rotor so as to conduct electrical current from one to the other, wherein the elastically yielding element extends from an end that is connected to one of said stator and rotor to a free end that slidably contacts the other of said stator and rotor under resilient biasing force generated by said elastically yielding element due to its elasticity and its extension along a path that winds around said axis, and wherein the elastically yielding element is integral with the stator and is in contact with the inner surface of the rotor.

9. A rolling head for a resistance seam welding machine comprising: a stator; an annular electrode constituting the rotor rotatably mounted on the stator and coaxial therewith for rotation about an axis; a device for conducting electricity through a sliding contact, positioned between the stator and the rotor and pressed against at least one of them by an elastic force; and conduits through which a coolant flows in the stator, in the rotor and in the sliding contact conductive device; wherein the sliding contact conductive device comprises a plurality of elastically yielding elements positioned between the stator and the rotor and distributed around a common axis and adapted to remain permanently in contact with the stator and the rotor so as to conduct electrical current from one to the other, wherein each elastically yielding element extends from an end that is connected to one of said stator and rotor to a free end that slidably contacts the other of said stator and rotor under resilient biasing force generated by said elastically yielding element due to its elasticity and its extension along a path that winds around said axis.

10. The head according to claim 9, wherein each elastically yielding element has a shaped end with a cylindrical surface portion, the end being designed to come into contact with a matching cylindrical surface portion of the rotor opposite it.

11. A rolling head for a resistance seam welding machine comprising: a stator; an annular electrode constituting the rotor rotatably mounted on the stator and coaxial therewith for rotation about an axis; a device for conducting electricity through a sliding contact, positioned between the stator and the rotor and pressed against at least one of them by an elastic force; and conduits through which a coolant flows in the stator, in the rotor and in the sliding contact conductive device; wherein the sliding contact conductive device comprises elastically yielding elements forming a radial sector, positioned between the stator and the rotor and designed to remain permanently in contact with the stator and the rotor so as to conduct electrical current from one to the other, wherein the elastically yielding element extends from an end that is connected to one of said stator and rotor to a free end that slidably contacts the other of said stator and rotor under resilient biasing force generated by said elastically yielding element due to its elasticity and its extension along a path that winds around said axis, and wherein the conduits run between adjacent elastically yielding elements and are each delimited by a pair of lateral surfaces of the elastically yielding elements.

12. The head according to claim 11, wherein the conduits can be crossed by a coolant flowing in a direction parallel to the axis of rotation of the rotor.

13. The head according to claim 4, wherein the branches of the sinusoidal arc are arch shaped.

14. The head according to claim 4, wherein the branches of the sinusoidal arc are positioned parallel to each other.

* * * * *